United States Patent [19]
Kato

[11] 3,975,275
[45] Aug. 17, 1976

[54] CONVEYER FOR REMOVING FLOATING OBJECTS

[76] Inventor: Shogo Kato, 2-23, Asahi, Fukushima, Fukushima, Japan

[22] Filed: Oct. 17, 1974

[21] Appl. No.: 515,714

[52] U.S. Cl. .............................. 210/160; 198/175; 210/400
[51] Int. Cl.² ................. B01D 33/32; B65G 19/22
[58] Field of Search .............. 198/7 R, 11, 13, 160, 198/168, 172, 173, 198, 175; 210/154–161, 391, 396, 526, 400

[56] References Cited
UNITED STATES PATENTS

| | | | |
|---|---|---|---|
| 1,065,596 | 6/1913 | Dick | 198/173 X |
| 1,293,050 | 2/1919 | Dick | 198/172 X |
| 1,812,287 | 6/1931 | Davis | 198/198 |
| 2,307,601 | 1/1943 | Nichols | 210/160 X |
| 2,671,563 | 3/1954 | Benner | 210/159 |
| 2,684,157 | 7/1954 | Tolman | 210/159 |
| 2,696,308 | 12/1954 | Martin | 210/159 |
| 3,464,558 | 9/1969 | Harvanek | 210/159 |
| 3,615,012 | 10/1971 | Verbant | 210/159 |
| 3,768,657 | 10/1973 | Hoag | 210/526 X |

FOREIGN PATENTS OR APPLICATIONS

640;134   7/1950   United Kingdom ................ 198/198

*Primary Examiner*—Evon C. Blunk
*Assistant Examiner*—James L. Rowland
*Attorney, Agent, or Firm*—Wenderoth, Lind & Ponack

[57] ABSTRACT

A conveyor for removing floating objects from a body of liquid. The conveyor has a plurality of parallel bars, endless chains running below the bars, transverse frames on the endless chains, and extending transversely of the parallel bars, and a plurality of teeth on the transverse bars projecting upwardly between the bars and moving along the bars during the movement of the endless chains. The parallel bars are attached to the conveyor only at the lower end thereof and are freely suspended over the conveyor at the upper end thereof. The teeth are mounted in a channel-shaped transverse bar, and held therein in a slotted fixing plate which is positioned in the channel shaped transverse bar. In addition, a supporting frame can be mounted on the transverse bar to support the parallel bars spaced from the transverse bar to avoid wear on the transverse bar.

3 Claims, 12 Drawing Figures

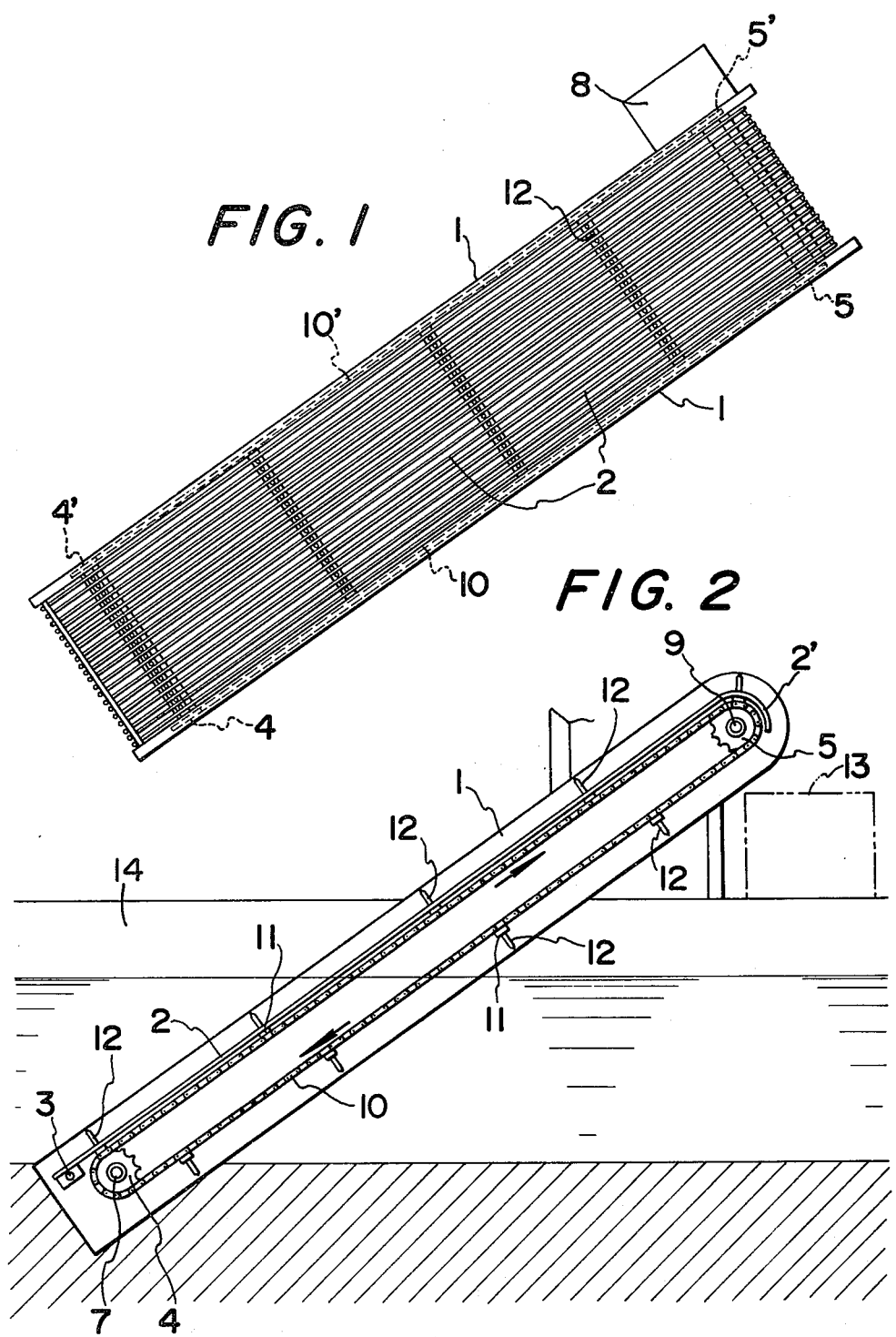

CONVEYER FOR REMOVING FLOATING OBJECTS

The present invention relates to a conveyor for removing objects and floating in a flowing body of liquid, such as water in a drain channel or at a water gate or for a transporting means utilizing water way, which conveyor is characterized in that the bars of said conveyor are in no danger of being blocked due to objects being transferred thereby. The conveyor is adequate for removing tiny floating objects, has excellent durability and generates little noise.

A conveyor according to the prior art for removing floating objects from a body of liquid is constructed so that floating objects will rest on the fixed bars thereof and they will be removed by being scraped up along the bars. Therefore, floating objects are likely to block the bars, which results in preventing smooth flowing of liquid, that is, causing liquid to eddy or flow in disorder. Therefore noises or oscillation will be generated, and constant inspection of the conveyer operation must be carried out so as to prevent the bars from being blocked.

In addition, in a conveyor system wherein bars are fixed, it is not possible to make the gap therebetween them very narrow, and it is necessary to prevent friction resistance and wear of the bars, and of scraping teeth moving through the gap therebetween, which results in the defect that the system is not adequate for removing tiny floating objects from the body of liquid.

It is an object of the present invention to overcome the defects of the prior art as described above to provide a conveyer for removing floating objects from a body of liquid without blocking of the bars.

It is another object of the present invention to provide a conveyer for removing floating objects from a body of liquid which is able to remove tiny floating objects easily.

It is still another object of the present invention to provide a conveyer for removing floating objects from a body of liquid in which friction of the bars and scraping of the teeth is reduced to a minimum.

Referring to the drawings,

FIG. 1 is a plan view of the conveyor of the present invention;

FIG. 2. is a side elevation view thereof;

Figure 3:
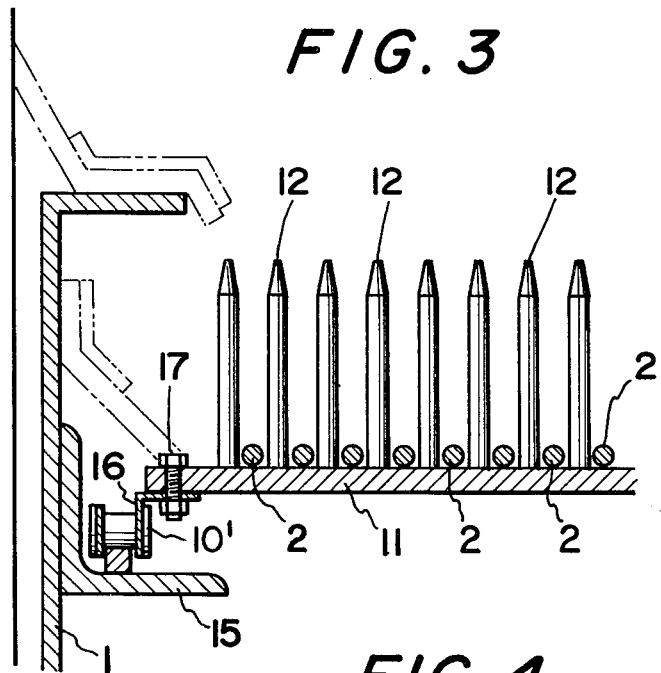
FIG. 3 is an enlarged sectional view of the main parts thereof.

The numeral 1 designates a conveyer frame comprising two parallel side boards inclined at an angle to the surface of a body of water from which objects are to be picked up.

The numeral 2 designates bars spaced at regular intervals across conveyor frame 1, and extending parallel to the side boards so as to form a screen. The lower end of each bar 2 is supported by a supporting shaft 3 extending between side boards, while the upper end 2' thereof is only curved downward and is able to move freely. The numerals 4 and 4' designate sprocket wheels at the lower end of conveyer frame 1 on shaft 7.

The numerals 5 and 5' are sprocket wheels at the upper end of conveyor frame 1 on shaft 9. Sprockets 5 and 5' are fixed to shaft 9 and shaft 9 is rotated by means of a motor and gears in gear box 8.

The numerals 10 and 10' designate chains extending around sprocket wheels 4 and 5 and sprocket wheels 4' and 5', respectively. Transverse frames 11 are provided at regular intervals between the right and the left chains as to support bars 2 from below. From the transverse frames scraping teeth 12 project above bars 2 through the gaps therebetween.

In the drawings the numeral 13 designates a bin while the numeral 14 designates a water way. The numeral 15 in FIG. 3 designates an angle bar in the shape of L welded to the inside of conveyor frame 1 to support the upper runs of the chains. The numeral 16 designates an attaching member on chain 10' and connected to transverse frame 11. The bolt and nut used for attaching member 16 and frame 11 is designated by the numeral 17.

Figure 4:
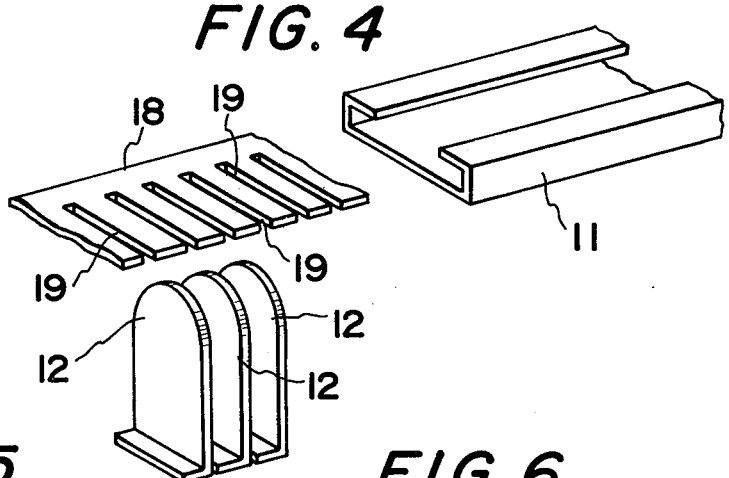
FIG. 4 is an exploded partial perspective view of the parts of the scraping teeth thereof.
Figure 5:
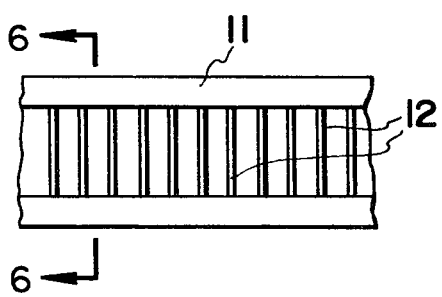
FIG. 5 is a top plan view of the parts of FIG. 4 in the assembled condition.
Figure 6:
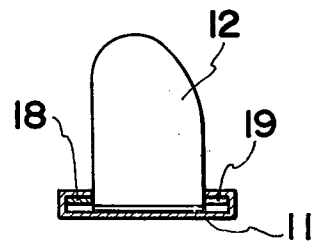
FIG. 6 is a sectional view on the line 6—6 of FIG. 5.
Figure 7:
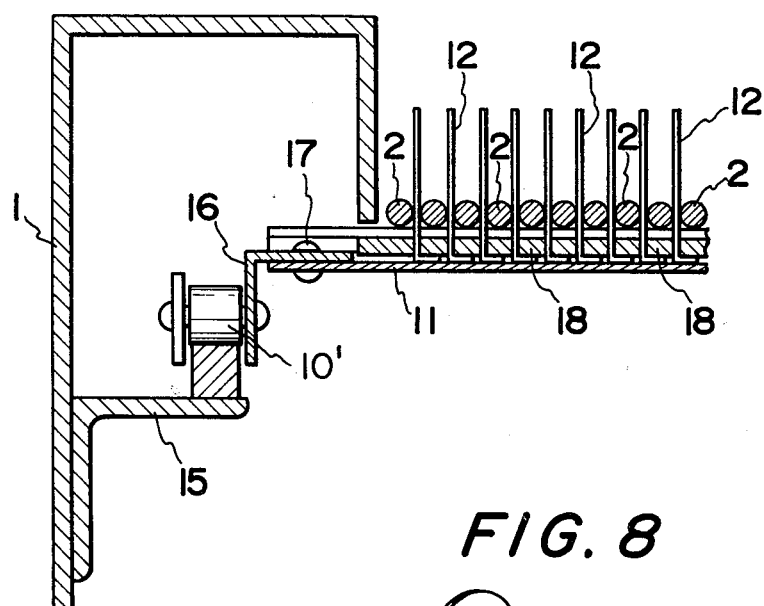
FIG. 7 is a partial sectional view of the scraping teeth in the conveyor.

In FIGS. 4, 5, 6 and 7, there is shown an embodiment of the present invention for achieving a good mounting of specially shaped scraping teeth 12 on transverse frame 11. The embodiment is particularly useful in a structure in which the gap between bars 2 is very narrow, e.g. approximately 0.3mm. Such a narrow gap enables a conveyer in accordance with the present invention to remove even tiny objects from the body of liquid. Scraping teeth 12 are flat sheet-like members formed of stainless steel and having the lower ends bent at right angles to the main portion thereof, and the trasnverse frames 11 are channel-shaped in cross-section and have inwardly directed portions at the tops of the side walls thereof. The scraping teeth 12 are supported in slits 19 in a fixing board 18, and the fixing board is inserted into the transverse frame 11 and fixed therein. FIGS. 5 and 6, show that the fixing board 18 extends under the inwardly extending portions of frame 11 and the bent lower ends of the teeth 12 extend under the fixing board 18, whereby the teeth are held on the transverse frame.

Figure 8:
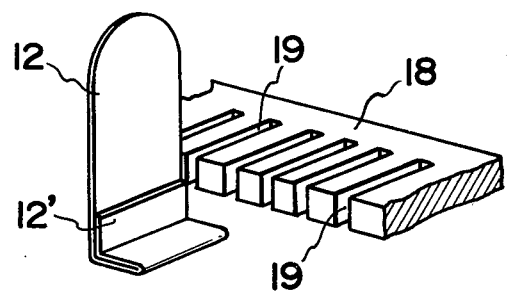
FIG. 8 is a perspective view showing an attachment means for the scraping teeth and the structure thereof.
Figure 9:
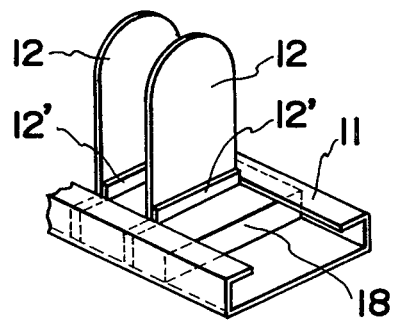
FIG. 9 is a perspectiv view of the scraping teeth of FIG. 8 in the assembled condition.
Figure 10:
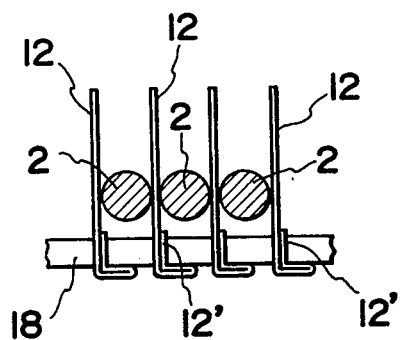
FIG. 10 is a sectional view showing the relation between the bars of the conveyor and the scraping teeth of FIGS. 8 and 9.

In FIGS. 8, 9 and 10, there is shown an embodiment of the present invention wherein scraping teeth 12 are modified. A scraping tooth 12, if made of thin metal plate, is in danger of shaking within slit 19 or having the neck part connected with fixing board 18 bent when it is constructed and mounted as shown in FIGS. 4, 5, 6, and 7. To improve the mounting of the scraping tooth 12, the lower end of the metal plate from which the scraping tooth 12 is formed is bent back on itself as at 12' and so as to extend slightly upwardly along the tooth, so that the part of the tooth engageable with the fixing board 18 has a double thickness. By this arrangement, the scraping tooth is also resiliently supported in the slit 19 by the spring force of the bent back part 12' of scraping tooth 12. The same fixing board 18 and channel-shaped transverse frame 11 are used to support these teeth.

Figure 11:
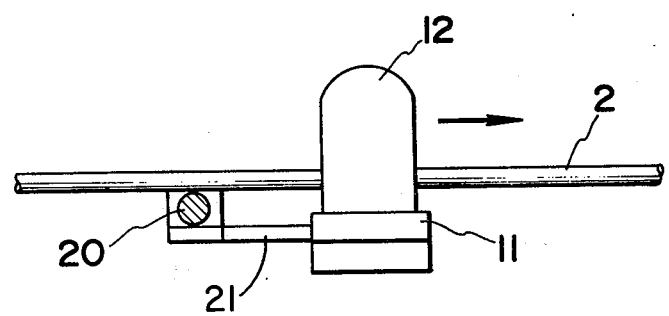
FIG. 11 is a side view showing a supporting member for the conveyor bar attached to a side frame.
Figure 12:
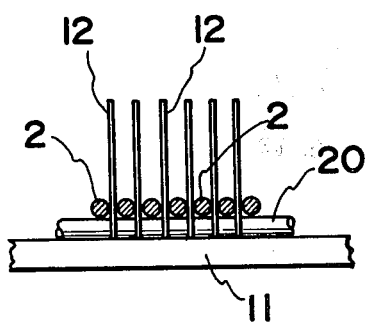
FIG. 12 is a transverse sectional view of the structure of FIG. 11.

In FIGS. 11 and 12, there is shown an embodiment of the present invention wherein a supporting frame 20 is mounted on projecting elements projecting in the direction of bars 2 from transverse frame 11 to support bars 2, and transverse frames 11 do not contact bars 2 and support them directly. As a result, there is no risk of wear of the surface of transverse frame 11, and wear of bars 2 is reduced.

The operation of the present invention thus constructed will now be described in detail.

First, the conveyor in accordance with the present invention is placed in liquid. e.g. water flowing in the water way 14 (FIG. 2), and when chains 10 and 10' rotate in the direction indicated by the arrow, transverse frames 11 move along bars 2 during movement of chains 10 and 10' in contact with the lower surface of bars 2. As a result, dirt and the like sticking to the bars 2 is removed and falls into the bin 13 from the curved parts 2' of the upper ends of bars 2 by the scraping teeth 12, as the teeth moving floating objects from the surface of the liquid up the conveyor. Bars 2 are always supported at the upper ends thereof by the transverse frames 11 so that the freely hanging ends thereof will not hang down. In addition, the intervals between bars 2 is maintained by scraping teeth 12, so that the conveyer can remove dirt and the like under the same condition.

In the present invention as described above, transverse frames 11 support bars 2 and the upper ends thereof are able to move freely. When said conveyor rotates, the interval between bars is regulated by the scraping teeth 12. Thus, dirt and the like getting into the gaps between bars 2 will be removed easily by means of said teeth 12 with no blocking of said bars 2.

Next, by using fixing boards 18, scraping teeth 12 made of thin metal plate, and transverse frames 11 as shown in FIG. 4, it is possible to make the interval between bars 2 very narrow, and to remove dirt and the like even if the particles are very small. Thin metal plate is available for making scraping teeth which are to be bent or folded at the lower side thereof to form a resilient part. And the durability of the scraping teeth themselves can be increased and oscillation thereof also can be prevented. Moreover, if the scraping teeth 12 are damaged, in order to repair the damage all that is necessary is to pull the fixing board 18 out, and replace the damaged scraping teeth 12 with undamaged ones. And when there is provided supporting frames 20 instead of transverse frames 11, it is possible to prevent heavy wear of frames 11, and when supporting frames 20 are to be exchanged, this can be done easily and the costs for replacements parts can be reduced greatly.

What is claimed is:

1. In a conveyor for removing floating objects from a body of liquid and having a plurality of parallel bars and endless chain means running below said bars with transverse frames on said endless chain means extending transversely of the parallel bars and having a plurality of teeth of the transverse bars projecting upwardly between said bars and moving along said bars during movement of the endless chain means, an improved transverse frame and tooth structure comprising a transverse bar having a channel shape cross-section with inwardly extending portions along the upper edges of the sides of the bar with a space therebetween, flat sheet-like teeth having the lower ends bent at a right angle to the main portion of the teeth, and a fixing plate having a plurality of parallel slits therein transverse to the length thereof with a width sufficient to accommodate the flat sheet-like teeth, said fixing plate having a greater width than the space between the inwardly projecting portions on the transverse bar, the teeth having the main portion positioned in the slits in the fixing plate with the bent lower ends under the fixing plate, and the fixing plate being inserted into the transverse bar with the teeth projecting through the space between the inwardly extending portions.

2. The improved transverse frame and tooth structure as claimed in claim 1 in which said bent lower end of each tooth is comprised of a first laterally extending portion lateral with the main portion of the tooth, a second laterally extending portion integral with the free end of the first laterally extending portion and bent back along the upper surface of the first laterally extending portion, and an upwardly extending portion integral with the end of the second laterally extending portion and extending upwardly along the main tooth portion.

3. A conveyor for removing floating objects from a body of liquid comprising a plurality of parallel bars, an endless chain means running below said bars, transverse frames on said endless chain means extending transversely of said parallel bars, a plurality of teeth on said transverse bars projecting upwardly between said bars and moving along said bars during movement of said endless chain means, projections on said transverse bars extending parallel to said parallel bars, and support frames on the ends of said projections extending parallel to said transverse bars and positioned closer to said parallel bars than said transverse frames and engaging said parallel bars and supporting them in spaced relation to said transverse frames, whereby wear on the transverse bars is avoided.

* * * * *